US008044960B2

(12) United States Patent
Sakurai et al.

(10) Patent No.: US 8,044,960 B2
(45) Date of Patent: Oct. 25, 2011

(54) CHARACTER DISPLAY APPARATUS

(75) Inventors: Mitsumasa Sakurai, Tokyo (JP); Yuusuke Yokosuka, Tokyo (JP); Shoji Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 532 days.

(21) Appl. No.: 12/323,702

(22) Filed: Nov. 26, 2008

(65) Prior Publication Data

US 2009/0256852 A1 Oct. 15, 2009

(30) Foreign Application Priority Data

Apr. 15, 2008 (JP) ................................ 2008-105868

(51) Int. Cl.
*G06T 11/00* (2006.01)
*G09G 5/02* (2006.01)
*G09G 5/36* (2006.01)

(52) U.S. Cl. ......................... 345/467; 345/589; 345/557

(58) Field of Classification Search .................. 345/467, 345/589, 557; 358/1.16
See application file for complete search history.

(56) References Cited

U.S. PATENT DOCUMENTS 5,226,116 A * 7/1993 Sasaki ........................... 345/467
5,559,530 A * 9/1996 Yamashita et al. ............ 345/611
5,579,416 A * 11/1996 Shibuya et al. ............... 382/293
5,917,507 A * 6/1999 Sakurai ......................... 345/551
6,396,492 B1 5/2002 Frisken et al.
7,609,268 B2 * 10/2009 Kotiranta ...................... 345/467
2005/0146528 A1 * 7/2005 Kotiranta ...................... 345/467

FOREIGN PATENT DOCUMENTS

JP 6-118936 4/1994
JP 2923002 4/1999
JP 2006-521582 9/2006

* cited by examiner

*Primary Examiner* — Ryan R Yang

(74) *Attorney, Agent, or Firm* — Oblon, Spivak, McClelland, Maier & Neustadt, L.L.P.

(57) ABSTRACT

A character display apparatus searches through a cache means for vector font data which match character attributes of a character to be displayed to acquire the vector font data, and, when no vector font data which match the character attributes of the character to be displayed exist in the cache means, acquires the vector font data from a large-volume storage means. If there exists no corresponding luminance image data in the cache means, the character display apparatus acquires luminance image data generated from the vector font data. If there exists no corresponding display image in the cache means, the character display apparatus acquires display character image data generated from the luminance image data. The character display apparatus displays the display image which is thus acquired and which matches the character attributes of the character to be displayed on a display device.

2 Claims, 4 Drawing Sheets

CHARACTER DISPLAY APPARATUS

BACKGROUND OF THE INVENTION

1. Field of the Invention

The present invention relates to a character display apparatus which displays a character image.

2. Background of the Invention

A character display apparatus generates a character image from font data according to character information including a font type, a character code, and a character size. A character image is generated from outline font data which are vector data showing the appearance of a character, or from stroke font data which are vector data describing the frame of a character. More specifically, when displaying a character image on the screen of a display device, a character display apparatus carries out scaling of vector data as mentioned above according to the size of the character image to be outputted on the above-mentioned screen and fills the appearance or frame defined by the above-mentioned vector data with a color so as to generate the character image.

Generation of a character image is a process of converting predetermined vector data into the character image having one of a wide variety of sizes, as mentioned above, and has a high processing load and consumes many CPU resources. Therefore, in order to achieve an improvement in the speed of generation of a character image, there has been proposed a technology for storing vector data used for generation of a character image in a cache memory and reusing the vector data stored in the cache memory when generating a new character image.

For example, an apparatus disclosed by patent reference 1 stores vector font data for each and every font type in a storage unit, such as a large-volume hard disk drive, and is also provided with a first cache memory for storing generated character images, and a second cache memory for storing vector font data used for generation of character images.

When generating a character image, the apparatus searches through the first cache memory after receiving a font type and a character size as inputs thereof, and, if the apparatus cannot search for a character image corresponding to the input data, further searches through the second cache memory. If vector font data corresponding to the input data are stored in the second cache memory, the apparatus generates a character image by using the vector font data. In contrast, unless vector font data corresponding to the input data are stored in the second cache memory, the apparatus extracts the above-mentioned vector font data from the storage unit and then expands the vector font data, and then generates a character image.

Thus, because the apparatus according to the invention disclosed by the patent reference 1 is provided with the first cache memory for storing character images, the apparatus can output a character image whose font type and size match the input data at a high speed. Furthermore, because the apparatus has the second cache memory for storing vector font data, when generating a character image whose font type matches the input data, but whose size does match the input data, the apparatus can acquire corresponding vector font data without accessing the storage unit.

By doing in this way, even when the character size of an on-screen character is changed, if corresponding vector font data whose font type matches that of the character exist in the second cache memory, the conventional apparatus can generate a character image at a high speed without accessing the storage unit.

[Patent reference 1] JP,6-118936,A

In embedded systems in which, in recent years, an improvement has been achieved in the resolution of a display device, there are frequent cases in which on-screen characters are color-coded in order to improve the visibility of display information. That is, some character images which have the same font type and the same character size, but have different foreground colors and different background colors are generated.

In this case, in accordance with a structure, as shown in the patent reference 1, of storing a final character image in a cache memory, when a character image to be newly generated has the same font type and the same character size as the previous character image, but has a different foreground color and a different background color, the character image stored in the cache memory is not reused. Therefore, in this case, the storage unit has to be accessed and the character image has to be generated, and no improvement can be achieved in the speed of the character image generation processing.

Furthermore, conventionally, an improvement is achieved in the speed of data input by acquiring vector font data from a cache memory, though it is necessary to, after acquiring the vector font data, carry out a high-processing-load process of converting the vector font data into a character image. A problem is therefore that even if data acquisition is carried out at a high speed, an improvement cannot be achieved in the speed of generation of a final character image, depending upon the processing performance of the conventional apparatus.

SUMMARY OF THE INVENTION

The present invention is made in order to solve the above-mentioned problems, and it is therefore an object of the present invention to provide a character display apparatus which can perform acquisition of data about a character image at a high speed even if only the display color of the character image is changed, and which can generate a character image without performing any high-processing-load process.

In accordance with the present invention, there is provided a character display apparatus including: a storage means for storing a plurality of vector font data each having character attributes; a display image generating means for applying a display color to a character image which is based on vector font data so as to generate display character image data in a data format which can be displayed by a display device; a first cache means for holding the display character image data generated by the display image generating means; a luminance image generating means for generating luminance image data in which luminance values of pixels of a character image based on vector font data are described; a second cache means for holding the luminance image data generated by the luminance image generating means; a third cache means for holding vector font data; a first acquiring means for searching through the third cache means for vector font data which match character attributes of a character to be displayed to acquire the vector font data, and for, when no vector font data which match the character attributes of the character to be displayed are held by the third cache means, acquiring the vector font data which match the character attributes of the character to be displayed from the storage means; a second acquiring means for searching through the second cache means for luminance image data which match character attributes of the character to be displayed to acquire the luminance image data, and for, when no luminance image data which match the character attributes of the character to be displayed are held by the second cache means, acquiring luminance image data which the luminance image generating means generates on a basis of the vector font data acquired by the first acquiring means; a third acquiring means for searching through the first cache means for display character image data which match character attributes of the character to be displayed to acquire the display character image data, and for, when no display character image data which match the character attributes of the character to be displayed are held by the first cache means, acquiring display character image data which the display image generating means generate on a basis of the luminance image data acquired by the second acquiring means; and a display control means for displaying the display character image data which are acquired by the third acquiring means and which match the character attributes of the character to be displayed on the display device.

According to the present invention, the character display apparatus searches through the cache means for vector font data which match character attributes of a character to be displayed to acquire the vector font data, and, when there exist no vector font data which match the character attributes of the character to be displayed in the cache means, acquires the vector font data from the large-volume storage means. Furthermore, the character display apparatus searches through the cache means for luminance image data which match the character attributes of the character to be displayed, and if there exist no luminance image data which match the character attributes of the character to be displayed in the cache means, the character display apparatus acquires luminance image data which are generated on the basis of the vector font data acquired as mentioned above. In addition, the character display apparatus searches through the cache means for display character image data which match the character attributes of the character to be displayed to acquire the display character image data, and, if there exist no display character image data which match the character attributes of the character to be displayed in the cache means, the character display apparatus acquires display character image data which are generated on the basis of the luminance image data acquired as mentioned above. The character display apparatus displays the display character image data which are thus acquired and which match the character attributes of the character to be displayed on the display device. By doing in this way, the character display apparatus can perform acquisition of data about a character image at a high speed even if only the display color of the character image is changed. Furthermore, the present invention offers an advantage of being able to generate a character image without performing any high-processing-load process.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
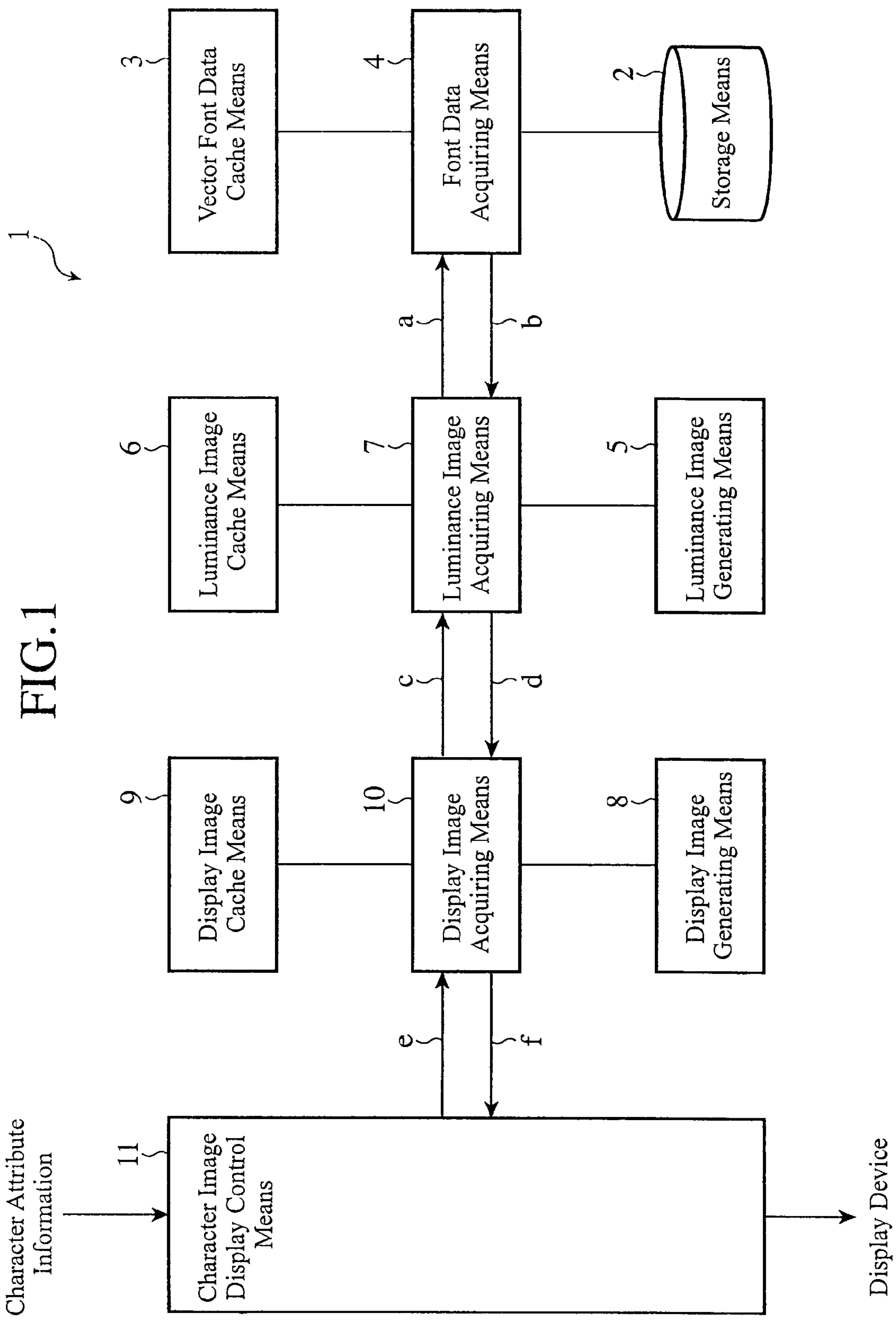
FIG. 1 is a block diagram showing the structure of a character display apparatus in accordance with Embodiment 1 of the present invention.

FIG. 1 is a block diagram showing the structure of a character display apparatus in accordance with Embodiment 1 of the present invention. In FIG. 1, the character display apparatus 1 in accordance with Embodiment 1 is provided with a storage means 2, a vector font data cache means 3, a font data acquiring means 4, a luminance image generating means 5, a luminance image cache means 6, a luminance image acquiring means 7, a display image generating means 8, a display image cache means 9, a display image acquiring means 10, and a character image display control means 11.

The storage means 2 stores vector font data which are character shape data consisting of an outline or a frame described by vectors. The vector font data cache means (a third cache means) 3 is a cache memory for storing vector font data. The font data acquiring means (a first acquiring means) 4, when accepting, as input data a, a font type and a character code from the luminance image acquiring means 7, acquires vector font data having attributes which match the font type and the character code from either the storage means 2 or the vector font data cache means 3, and outputs, as output data b, the acquired vector font data to the luminance image acquiring means 7.

The luminance image generating means 5 generates a luminance image of a character which is described as luminance values not having any specific foreground color and any specific background color from the vector font data inputted thereto via the luminance image acquiring means 7. A luminance image is the one in an image format which is described as luminance values not having any specific foreground color and any specific background color. A display image is the one in an image format which is colored with a foreground color and a background color, and which has been converted to have a data structure which can be processed by a display device.

The luminance image cache means (a second cache means) 6 is a cache memory for storing the luminance image data generated by the luminance image generating means 5. When receiving, as input data c, a font type, a character code, and a character size from the display image acquiring means 10, the luminance image acquiring means (a second acquiring means) 7 acquires a luminance image having attributes which match those attributes from either the luminance image generating means 5 or the luminance image cache means 6, and outputs, as output data d, the acquired luminance image to the display image acquiring means 10.

The display image generating means 8 generates display image data (display character image data) which have a foreground color and a background color and which has been converted to have a data format which can be displayed by the display device from the luminance image inputted thereto via the display image acquiring means 10. The display image cache means (a first cache means) 9 is a cache memory for storing the display image data generated by the display image generating means 8.

When receiving, as input data e, a font type, a character code, a character size, and a color of character on screen from the character image display control means 11, the display image acquiring means (a third acquiring means) 10 acquires a display image which matches those attributes from either the display image generating means 8 or the display image cache means 9, and outputs, as output data f, the acquired display image to the character image display control means 11.

The character image display control means (a display control means) 11 accepts an input of character attribute information including the font type, the character code, the character size, and the color of character on screen of a character to be displayed, acquires a display image which matches the inputted character attribute information from the display image acquiring means 10, and performs a character display process of displaying the character by using the display device.

By, for example, loading a program used for character image generation according to the concept of the present invention into a computer, and controlling the operation of the computer, the font data acquiring means 4, the luminance image generating means 5, the luminance image acquiring means 7, the display image generating means 8, the display image acquiring means 10, and the character image display control means 11, which are mentioned above, can be implemented as a concrete means having software and hardware which work in cooperation with each other on that computer.

The vector font data cache means 3, the luminance image cache means 6, and the display image cache means 9 can be constructed as storage regions of a cache memory mounted in the above-mentioned computer. The storage means 2 can be constructed in a mass storage device, such as a hard disk drive, which is mounted in the above-mentioned computer, or can be constructed in a storage device of an external computer which can carry out data communications with the font data acquiring means 4 and which is disposed separately from the above-mentioned computer.

Next, the operation of the character display apparatus will be explained. Character attribute information including the font type, the character code, the character size, and the color of character on screen of a character which is to be displayed is inputted to the character image display control means 11 via a not-shown input device. The character image display control means 11 outputs the inputted character attribute information to the display image acquiring means 10. When receiving, as input data e, the above-mentioned character attribute information, the display image acquiring means 10 searches through the display image generating means 8 and the display image cache means 9 by using, as search key information, the font type, the character code, the character size, and the color of character on screen of the character to be displayed, which are included in the character attribute information.

When acquiring, as a result of the above-mentioned search, a display image which matches the above-mentioned character attribute information from either the display image generating means 8 or the display image cache means 9, the display image acquiring means 10 outputs, as output data f, this display image to the character image display control means 11. The display image is a character image which is described in a data format which can be displayed by the display device. As the display image, in many cases, a data array which is colored in an RGB format or a data array which is colored in a color index format determined by a color look-up table is used.

The image format which can be displayed by the display device is determined by the number of bits allocated to each of the R value, the G value, and the B value of each pixel, and the size of the color look-up table. In addition, there can be a case in which the image format includes a transmission coefficient for use in a mixing process performed by the display device and a specific transmission color.

For example, in a case in which 8 bits are allocated to each of the R value, the G value, and the B value of each pixel, each pixel's color on the screen of the display device is determined by 24-bit data. Furthermore, in a case in which a color look-up table of 256 colors is used, each pixel's color on the screen of the display device is determined by an 8-bit color index value.

When receiving the display image which matches the character attribute information from the display image acquiring means 10, the character image display control means 11 outputs this display image to the display device. As a result, the character is displayed on the screen of the display device.

(1) Acquisition of a Display Image by the Display Image Acquiring Means 10

Figure 2:
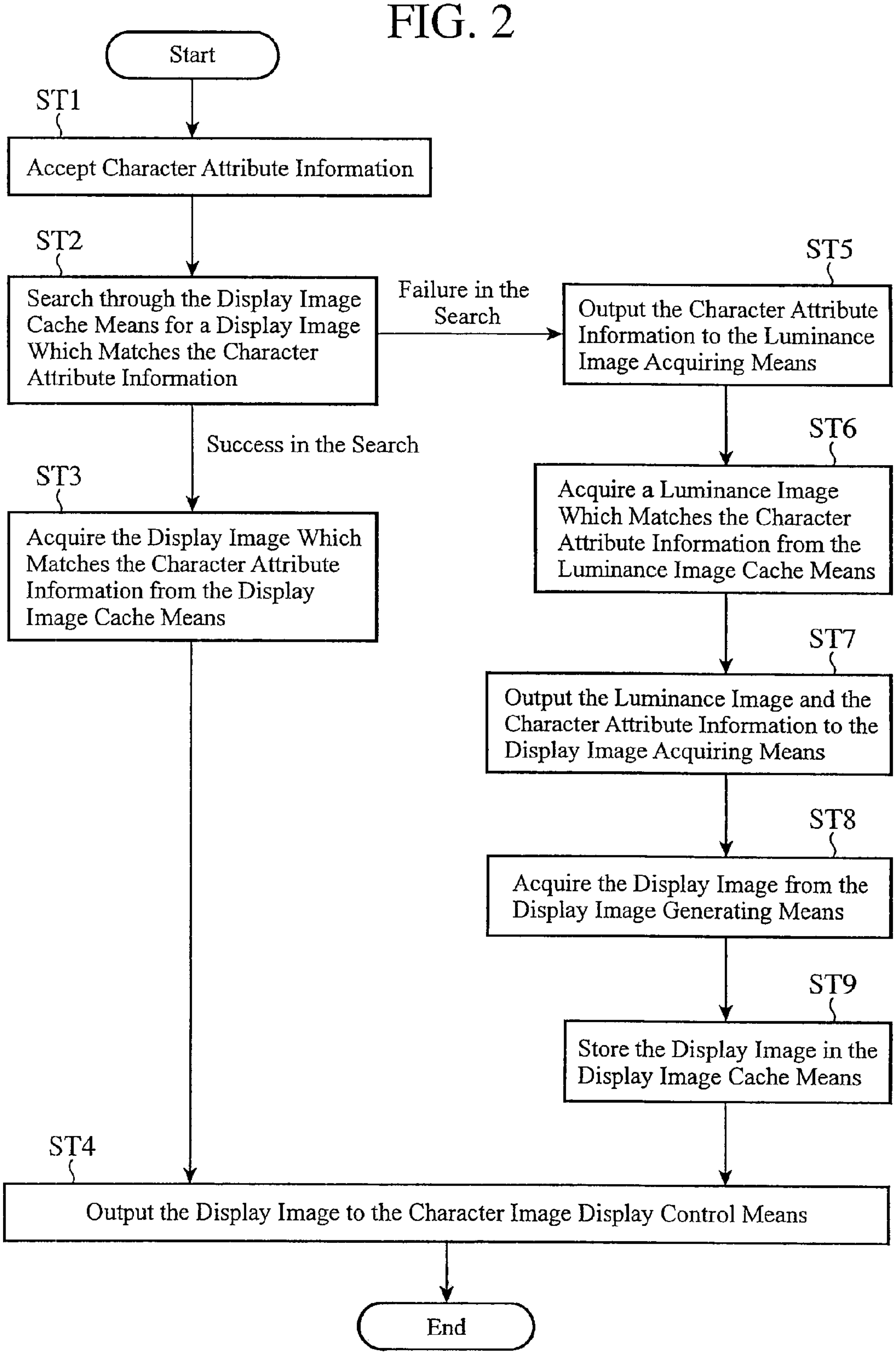
FIG. 2 is a flow chart showing a flow of the operation of a display image acquiring means shown in FIG. 1.

FIG. 2 is a flow chart showing a flow of the operation of the display image acquiring means shown in FIG. 1, and the details of the acquisition of a display image by the display image acquiring means 10 will be explained with reference to this figure. The display image acquiring means 10 accepts, as input data e, character attribute information including the font type, the character code, the character size, and the color of character on screen of a character to be displayed from the character image display control means 11 (step ST1).

The display image acquiring means 10 extracts the font type, the character code, the character size, and the color of character on screen of the character to be displayed from the character attribute information inputted thereto, and searches through the display image cache means 9 for a display image which matches these character attributes (step ST2). In this case, when a display image which matches the above-mentioned character attribute information is stored in the display image cache means 9 (when having succeeded in the search), the display image acquiring means 10 acquires the display image which matches the above-mentioned character attribute information from the display image cache means 9 (step ST3).

The display image acquired from the display image cache means 9 is outputted, as output data f, from the display image acquiring means 10 to the character image display control means 11 (step ST4). After that, the character image display control means 11 outputs this display image to the display device. As a result, the character which matches the above-mentioned character attribute information is displayed on the screen of the display device.

In contrast, when, in step ST2, no display image which matches the above-mentioned character attribute information is stored in the display image cache means 9 (when having failed in the search), the display image acquiring means 10 outputs the above-mentioned character attribute information to the luminance image acquiring means 7 (step ST5). The luminance image acquiring means 7 extracts the font type, the character code, the character size, and the color of character on screen of the character to be displayed from the above-mentioned character attribute information which is inputted thereto as input data c, and searches through the luminance image cache means 6 for a luminance image which matches these character attributes.

In this case, when a luminance image which matches the above-mentioned character attribute information is stored in the luminance image cache means 6, the luminance image acquiring means 7 acquires the luminance image which matches the character attribute information from the luminance image cache means 6 (step ST6). After that, the luminance image acquiring means 7 outputs, as output data d, the above-mentioned character attribute information and the luminance image which matches this character attribute information to the display image acquiring means 10 (step ST7). The output data d are outputted to the display image generating means 8 via the display image acquiring means 10.

The display image generating means 8 generates a display image which matches the above-mentioned character attribute information on the basis of the above-mentioned character attribute information inputted thereto and the luminance image data which match this character attribute information, and outputs the display image to display image acquiring means 10 (step ST8). The display image acquiring means 10 then stores the display image which matches the above-mentioned character attribute information inputted from the display image generating means 8 in the display image cache means 9 (step ST9).

The display image acquiring means 10 also outputs, as output data f, the display image which matches the above-mentioned character attribute information to the character image display control means 11 (step ST4). The character image display control means 11 outputs this display image to the display device in the above-mentioned way. As a result, the character which matches the above-mentioned character attribute information is displayed on the screen of the display device.

(2) Generation of a Display Image by the Display Image Generating Means 8

Hereafter, the operation of generating a display image which is carried out by the display image generating means 8 will be explained in detail. As mentioned above, the display image generating means 8 generates a display image on the basis of a luminance image and character attribute information which are inputted thereto. A luminance image is the one in an image format which is not colored, but is described with only luminance values. For example, in a case in which 256 levels of luminance is allocated to each pixel, a luminance image is described as 8-bit binary data per pixel.

The display image generating means 8 extracts data which define a foreground color and a background color from the above-mentioned character attribute information, and determines each pixel's color in the display image on the basis of the luminance values described in the above-mentioned luminance image data. The determination of each pixel's color is defined as transform functions for transforming the inputted luminance value of each pixel to a display pixel color. For example, when the luminance value of a pixel in question is expressed as L, the foreground color of the pixel is expressed as Rf, Gf, and Bf, and the background color of the pixel are expressed as Rb, Gb, and Bb, and each value is normalized in such a way as to fall within a region of 0 to 1, the display pixel color Rd, Gd, and Bd of the pixel of the display image can he computed by using the transform functions given by the following equations (1) to (3):

$$Rd=L\times Rf+(1-L)\times Rb \quad (1)$$

$$Gd=L\times Gf+(1-L)\times Gb \quad (2)$$

$$Bd=L\times Bf+(1-L)\times Bb \quad (3)$$

As an alternative, nonlinear transform functions for the luminance value can be defined instead of those given by the above-mentioned equations, and the display color of each pixel can be determined according to the nonlinear transform functions.

The display image generating means 8 then determines each pixel's value which is to be stored as the display image on the basis of the pixel color calculated as mentioned above. For example, when the display device represents color values by using a color look-up table, the display image generating means searches for a color value corresponding to the calculated display pixel color of each pixel from the color look-up table, and stores the corresponding color index value in the display image. After storing the color values of all the pixels in the display image, the display image generating means 8 outputs this display image to the display image acquiring means 10.

(3) Acquisition of a Luminance Image by the Luminance Image Acquiring Means 7

Figure 3:
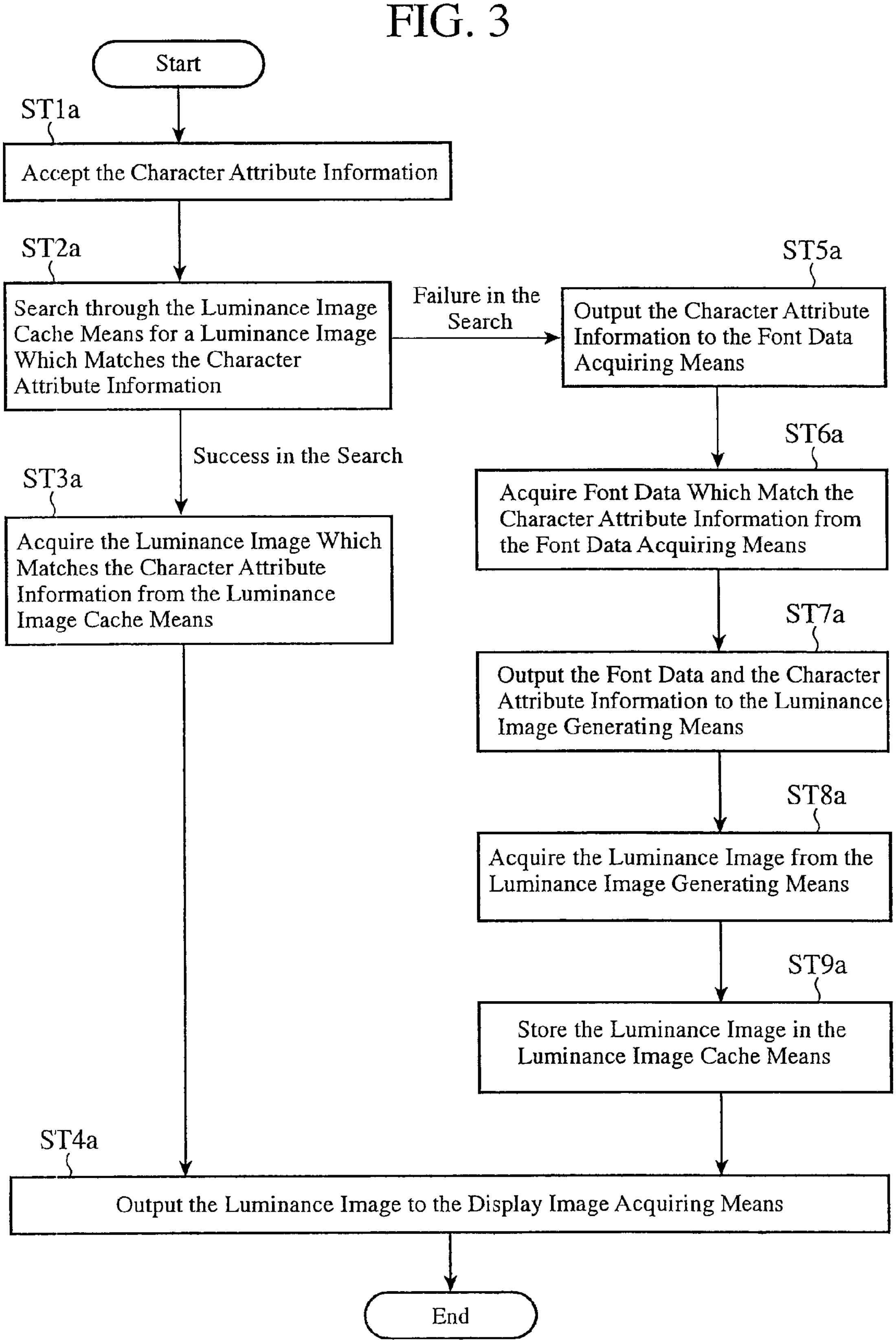
FIG. 3 is a flow chart showing a flow of the operation of a luminance image acquiring means shown in FIG. 1.

FIG. 3 is a flow chart showing a flow of the operation of the luminance image acquiring means shown in FIG. 1, and the operation of acquiring a luminance image by the luminance image acquiring means 7 will be explained in detail with reference to this figure. The luminance image acquiring means 7 accepts, as input data c, the character attribute information including the font type, the character code, the character size, and the color of character on screen of the character to be displayed from the display image acquiring means 10 (step ST1*a*).

The luminance image acquiring means 7 extracts the font type, the character code, and the character size of the character to be displayed from the character attribute information inputted thereto, and searches through the luminance image cache means 6 for a luminance image which matches these character attributes (step ST2*a*). In this case, when a luminance image which matches the above-mentioned character attribute information is stored in the luminance image cache means 6 (when having succeeded in the search), the luminance image acquiring means 7 acquires the luminance image which matches the above-mentioned character attribute information from the luminance image cache means 6 (step ST3*a*).

The luminance image acquired from the luminance image cache means 6 is outputted, as output data d, from the luminance image acquiring means 7 to the display image acquiring means 10 (step ST4*a*). After that, the display image acquiring means 10 outputs this luminance image to the display image generating means 8. As a result, the display image generating means 8 generates a display image which matches the above-mentioned character attribute information by using this luminance image in the above-mentioned way.

In contrast, when, in step ST2*a*, no luminance image which matches the above-mentioned character attribute information is stored in the luminance image cache means 6 (when having failed in the search), the luminance image acquiring means 7 outputs the above-mentioned character attribute information to the font data acquiring means 4 (step ST5*a*). The font data acquiring means 4 searches through the vector font data cache means 3 for vector font data which match the above-mentioned character attribute information inputted thereto as input data a.

When vector font data which match the above-mentioned character attribute information are stored in the vector font data cache means 3, the font data acquiring means 4 acquires the vector font data which match the character attribute information from the vector font data cache means 3 (step ST6*a*). After that, the font data acquiring means 4 outputs, as output data b, the above-mentioned character attribute information and the vector font data which match this character attribute information to the luminance image acquiring means 7 (step ST7*a*) The output data b are then outputted to the luminance image generating means 5 via the luminance image acquiring means 7.

The luminance image generating means 5 generates a luminance image which matches the above-mentioned character attribute information on the basis of the above-mentioned character attribute information and the vector font data which match this character attribute information, which are inputted thereto, and outputs the luminance image to the luminance image acquiring means 7 (step ST8*a*). The luminance image acquiring means 7 then stores the luminance image which matches the above-mentioned character attribute information and which is inputted from the luminance image generating means 5 in the luminance image cache means 6 (step ST9*a*).

The luminance image acquiring means 7 also outputs, as output data d, the luminance image which matches the above-mentioned character attribute information to the display image acquiring means 10 (step ST4*a*). After that, the display image acquiring means 10 outputs this luminance image to the display image generating means 8 in the above-mentioned way. As a result, the display image generating means 8 generates a display image which matches the above-mentioned character attribute information by using this luminance image.

(4) Generation of a Luminance Image by the Luminance Image Generating Means 5

Hereafter, the operation of generating a display image which is carried out by the luminance image generating means 5 will be explained in detail. As mentioned above, the luminance image generating means 8 generates a luminance image on the basis of the vector font data and the character attribute information which are inputted thereto. A luminance image is a character image which is described with luminance values not having any specific color information, and is converted into display color values by using the transform functions given by the above-mentioned equations (1) to (3), which are explained in the case of generation of a display image by the display image generating means 8.

When receiving vector font data which match the above-mentioned character attribute information, the luminance image generating means 7 extracts data which define a display image size from the above-mentioned character attribute information, and enlarges or reduces the size of the vector font data to the display image size. The luminance image generating means 7 then calculates a luminance value corresponding to a specific pixel included in the luminance image from the vector font data which have been changed in size so as to generate the luminance image which matches the above-mentioned character attribute information.

As an example of the calculation of the luminance value of each pixel included in the luminance image, there can be provided a method of determining the luminance value as the percentage of the filled-in area occupying each pixel. For example, when the luminance value of each pixel is expressed as a value ranging from 0.0 to 1.0, as the luminance value of a pixel which is not filled, 0.0 is stored, as the luminance value of a pixel the total area of which is filled, 1.0 is stored, and as the luminance value of a pixel 50 percent of the total area of which is filled, 0.5 is stored.

Furthermore, there can be provided, as another determining method, a method of storing the distance between a vector and each pixel. In this case, the distance between each pixel and a vector which is the nearest to the center of each pixel in the luminance image is calculated, and is stored, as the luminance value of each pixel, in the luminance image.

(5) Acquisition of Vector Font Data by the Font Data Acquiring Means 4

Figure 4:
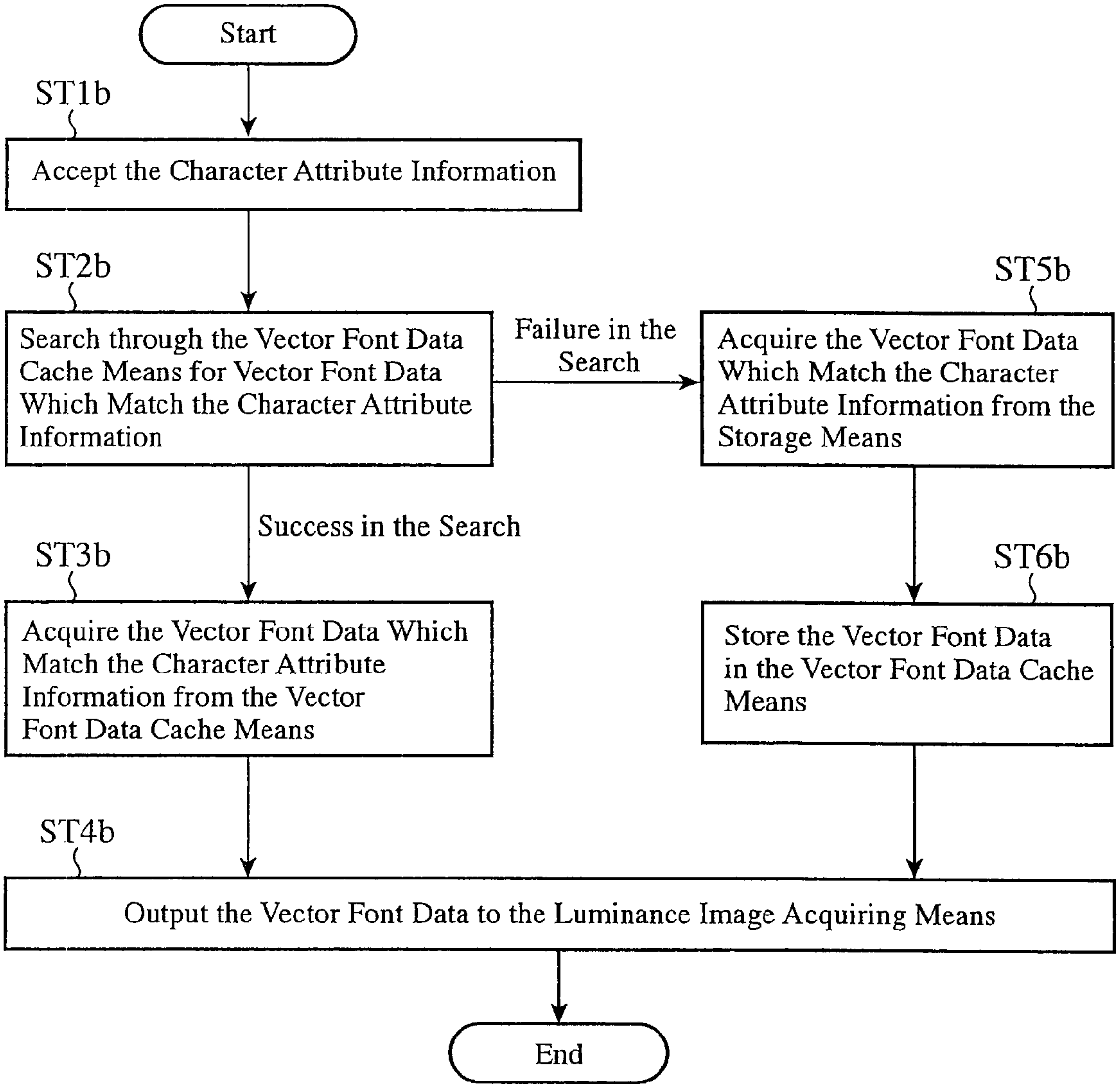
FIG. 4 is a flow chart showing a flow of the operation of a font data acquiring means shown in FIG. 1.

FIG. 4 is a flow chart showing a flow of the operation of the font data acquiring means shown in FIG. 1, and the operation of acquiring vector font data which is carried out by the font data acquiring means 7 will be explained in detail with reference to this figure. The font data acquiring means 4 accepts, as input data a, the character attribute information including the font type, the character code, the character size, and the color of character on screen of the character to be displayed from the luminance image acquiring means 7 (step ST1*b*).

The font data acquiring means 4 extracts the font type and the character code of the character to be displayed from the inputted character attribute information, and searches through the vector font data cache means 3 for vector font data which match these character attributes (step ST2*b*). At that time, if vector font data which match the above-mentioned character attribute information are stored in the vector font data cache means 3 (when having succeeded in the search), the font data acquiring means 4 acquires the vector font data which match the above-mentioned character attribute information from the vector font data cache means 3 (step ST3*b*).

The vector font data acquired from the vector font data cache means 3 are outputted, as output data b, from the font data acquiring means 4 to the luminance image acquiring means 7 (step ST4*b*). After that, the luminance image acquiring means 7 outputs these vector font data to the luminance image generating means 5. As a result, in the above-mentioned way, the luminance image generating means 5 generates a luminance image which matches the above-mentioned character attribute information by using the vector font data.

When, in step ST2*b*, no vector font data which match the above-mentioned character attribute information are stored in the vector font data cache means 3 (when having failed in the search), the font data acquiring means 4 searches through the storage means 2 for vector font data which match the above-mentioned character attribute information.

In contrast, when vector font data which match the above-mentioned character attribute information are stored in the storage means 2, the font data acquiring means 4 acquires the vector font data which match the character attribute information from the storage means 2 (step ST5*b*). The font data acquiring means 4 then stores the vector font data which match the above-mentioned character attribute information, which the font data acquiring means 4 has read from the storage means 2, in the vector font data cache means 3 (step ST6*b*).

The font data acquiring means 4 also outputs, as output data b, the vector font data which match the above-mentioned character attribute information to the luminance image acquiring means 7 (step ST4*b*). After that, in the above-mentioned way, the luminance image acquiring means 7 outputs these vector font data to the luminance image generating means 5. As a result, the luminance image generating means 5 generates a luminance image which matches the above-mentioned character attribute information by using the vector font data.

As mentioned above, the character display apparatus in accordance with this Embodiment 1 is provided with the storage means 2 for storing vector font data having a plurality of character attributes, the display image generating means 8 for applying a display color to a character image based on vector font data to generate a display image (a display character image data) in a data format which can be displayed by the display device, the display image cache means 9 for holding the display image generated by the display image generating means 8, the luminance image generating means 5 for generating luminance image data in which the luminance values of pixels of a character image based on vector font data are described, the luminance image cache means 6 for holding the luminance image data generated by the luminance image generating means 5, and the vector font data cache means 3 for holding vector font data.

In this structure, the font data acquiring means 4 searches through the vector font data cache means 3 for vector font data which match the character attributes of a character to be displayed to acquire the vector font data, and, when no vector font data which match the character attributes of the character to be displayed are held by the vector font data cache means 3, acquires the vector font data from the storage means 2. Furthermore, the luminance image acquiring means 7 searches through the luminance image cache means 6 for luminance image data which match the character attributes of the character to be displayed to acquire the luminance image data, and, when no luminance image data which match the character attributes of the character to be displayed are held by the luminance image cache means 6, acquires the luminance image data generated by the luminance image generating means 5 on the basis of the vector font data which the font data acquiring means 4 has acquired. In addition, the display image acquiring means 10 searches through the display image cache means 9 for a display image which matches the character attributes of the character to be displayed to acquire the display image, and, when no display image which matches the character attributes of the character to be displayed is held by the display image cache means 9, acquires the display image generated by the display image generating means 10 on the basis of the luminance image data which the luminance image acquiring means 7 has acquired. The character image display control means 11 displays the display image which the display image acquiring means 10 has acquired and which matches the character attributes of the character to be displayed on the display device.

Because the character display apparatus in accordance with this Embodiment 1 is constructed in this way, when displaying a character which matches character attributes, such as a font type, a character code, a character size, and a display color, the character display apparatus can acquire a display image from display image cache means 9 and display the display image, and can display the character image at a high speed without carrying out the high-processing-load character image generation processing.

Furthermore, according to this Embodiment 1, even if no display image which matches the character attribute information about the character to be displayed exists in the display image cache means 9, if luminance image data which match the font type, the character code, and character size of the character to be displayed, among the character attributes of the character to be displayed which are included in the above-mentioned character attribute information, are stored in the luminance image cache means 6, the character display apparatus in accordance with this Embodiment 1 can generate a display image without carrying out the high-processing-load luminance image generation processing. Therefore, the character display apparatus can perform a display of the character image at a high speed.

In addition, according to this Embodiment 1, even if neither a display image nor a luminance image which match the character display attributes of the character to be displayed are stored in the cache means, if vector font data which match the font type and the character code of the character to be displayed, among the above-mentioned character attributes, are stored in the vector font data cache means 3, the character display apparatus in accordance with this Embodiment 1 can acquire the vector font data from the vector font data cache means 3 without carrying out the high-processing-load process of acquiring the vector font data from the storage means 2. Therefore, the character display apparatus in accordance with this Embodiment 1 can carry out the generating process of generating a character image at a high speed, and can perform a display of the character promptly.

Many widely different embodiments of the present invention may be constructed without departing from the spirit and scope of the present invention. It should be understood that the present invention is not limited to the specific embodiments described in the specification, except as defined in the appended claims.

What is claimed is:

1. A character display apparatus comprising:

a storage means for storing a plurality of vector font data each having character attributes;

a display image generating means for applying a display color to a character image which is based on vector font data so as to generate display character image data in a data format which can be displayed by a display device;

a first cache means for holding the display character image data generated by said display image generating means;

a luminance image generating means for generating luminance image data in which luminance values of pixels of a character image based on vector font data are described;

a second cache means for holding the luminance image data generated by said luminance image generating means;

a third cache means for holding vector font data;

a first acquiring means for searching through said third cache means for vector font data which match character attributes of a character to be displayed to acquire the vector font data, and for, when no vector font data which match the character attributes of the character to be displayed are held by said third cache means, acquiring the vector font data which match the character attributes of the character to be displayed from said storage means;

a second acquiring means for searching through said second cache means for luminance image data which match character attributes of said character to be displayed to acquire the luminance image data, and for, when no luminance image data which match the character attributes of said character to be displayed are held by said second cache means, acquiring luminance image data which said luminance image generating means generates on a basis of the vector font data acquired by said first acquiring means;

a third acquiring means for searching through said first cache means for display character image data which match character attributes of said character to be displayed to acquire the display character image data, and for, when no display character image data which match the character attributes of said character to be displayed are held by said first cache means, acquiring display character image data which said display image generating means generate on a basis of the luminance image data acquired by said second acquiring means; and a display control means for displaying the display character image data which are acquired by said third acquiring means and which match the character attributes of said character to be displayed on said display device.

2. The character display apparatus according to claim 1, characterized in that the first acquiring means searches through the first cache means for vector font data which match a font type and a character code among the character attributes of the character to be displayed, the second acquiring means searches through the second cache means for luminance image data which match the font type, the character code, and a character size among the character attributes of said character to be displayed, and the third acquiring means searches through the third cache means for display character image data which match the font type, the character code, the character size, and a display color among the character attributes of said character to be displayed.

* * * * *